(No Model.)

M. R. FLETCHER.
PAPER PULP ENGINE.

No. 258,399. Patented May 23, 1882.

Witnesses
Wm. S. Bellows
H. S. McKeever

Moore R. Fletcher,
Inventor
PER Brown Bros.
ATTORNEYS.

N. PETERS, Photo-Lithographer, Washington, D. C.

UNITED STATES PATENT OFFICE.

MOORE R. FLETCHER, OF BRISTOL, NEW HAMPSHIRE, ASSIGNOR TO THE NEW HAMPSHIRE CHEMICAL PULP COMPANY, OF BOSTON, MASS.

PAPER-PULP ENGINE.

SPECIFICATION forming part of Letters Patent No. 258,399, dated May 23, 1882.

Application filed February 20, 1882. (No model.)

*To all whom it may concern:*

Be it known that I, MOORE R. FLETCHER, of Bristol, in the county of Grafton and State of New Hampshire, have invented certain new and useful Improvements in Paper-Pulp Engines, of which the following is a full, clear, and exact description.

This invention relates to apparatuses or engines for reducing straw, wood chips, &c., to a condition of pulp suitable to be used for the manufacture of paper, &c.; and this improved apparatus is composed in substance of a tank in which is a rotating vertical, conical, and ribbed drum, placed within a fixed vertical, conical, and ribbed shell, with an annular chamber or space between the two, open at each end to the tank, and a rotating fan, all substantially as hereinafter described.

Figure 1:
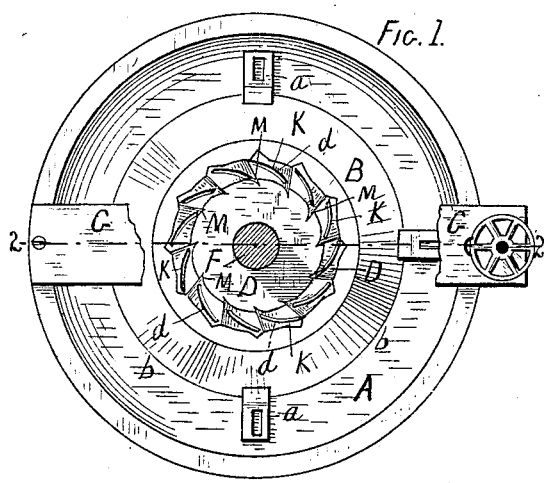
Figure 3:
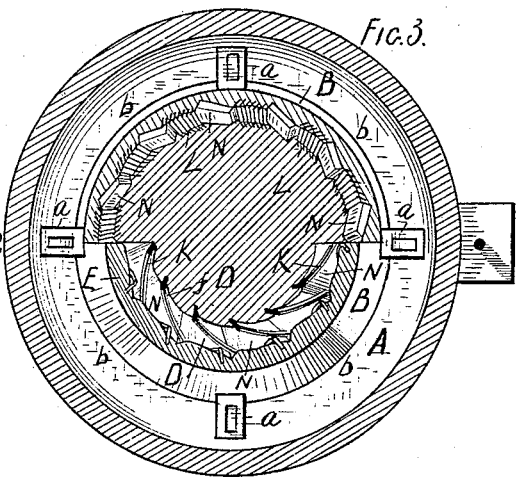
Figure 4:
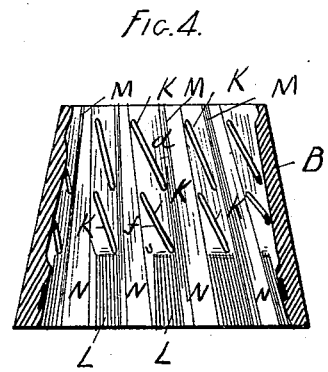
Figure 2:
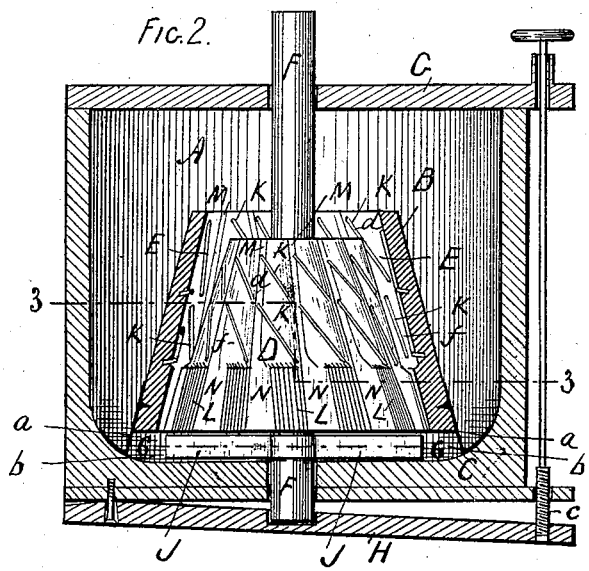
Figure 5:
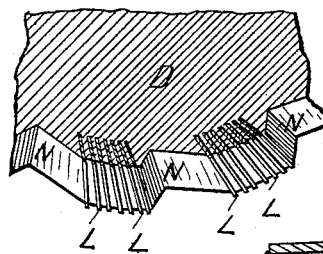
Figure 7:
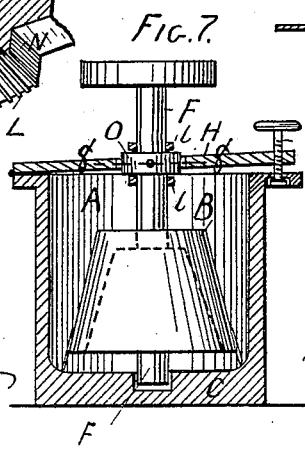
Figures 6, 8:
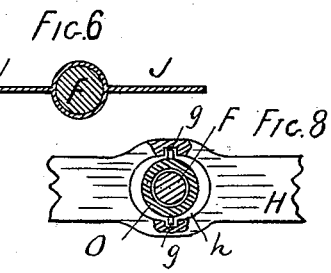

In the accompanying plate of drawings, Figure 1 is a plan view. Fig. 2 is a central vertical section on line 2 2, Fig. 1. Fig. 3 is a horizontal section on line 3 3, Fig. 2. Fig. 4 is a central vertical section of the ribbed shell. Fig. 5 is a horizontal section in detail of the ribbed drum. Fig. 6 is a horizontal section on line 6 6, Fig. 2. Fig. 7 is a central vertical section, showing a modification in the arrangement of mechanism for lifting and lowering the ribbed drum, to be hereinafter more particularly described; and Fig. 8 is a detail horizontal section on line 8 8, Fig. 7.

In the drawings, A represents a cylindrical tank or tub, and B a truncated conical shell. This shell B is open at each end. It is located wholly within the tank, to the bottom C of which its larger open end is secured by legs *a*, having open spaces *b* between them, in communication with the inner chamber of the shell and the chamber of the tub which surrounds the shell.

D is a truncated conical drum. The slant-height of this drum has a greater acute inclination than that of the shell, and otherwise its diameters are such as to leave an annular open space or chamber, E, between its outer surface or periphery and the inner surface or periphery of the shell, in which it is placed with its larger end lowermost, and by means of an axial journal or shaft projection, F, at each end it turns within suitable bearings of the fixed horizontal cross-bar G and the bottom C of the tank. The bearing in the tank-bottom C is suitably packed to prevent leakage, and the drum, hung as described, rests upon a lever-bar, H, which, at one end, is hinged to the bottom of the tank, and is adapted to be raised and lowered, turning upon such hinge by a screw, *c*, which enters into the lever-bar H as a screw-nut and otherwise is suitably arranged, so that if turned in one direction the lever-bar is raised toward and in the other direction lowered from the tank, and thus the drum in one case raised and in the other case lowered within the shell. In the first instance the chamber or space between the shell and drum is reduced, and in the second instance is increased, for a purpose which will hereinafter appear. The drum is to be arranged in any suitable manner to be rotated, and its lower shaft-projection carries horizontal fan wings or blades J in position under the rotation of the drum to travel and move around within the supporting-legs *a* of the shell and between the lower end of such shell and the bottom of the tank.

The disintegration of the straw, &c., and its reduction to a condition of pulp, are secured within the chamber or space E between the drum and shell, and for this purpose the outer periphery of the drum and the inner periphery of the shell are each provided with an arrangement of breaking or crushing ribs or edges, K, and of cutting or severing ribs or edges L. The breaking-ribs K are shown as in two rows or series, *d f*, each surrounding the drum or shell, as the case may be, and the one row above the other. Each breaking or crushing rib projects slightly from the periphery, and each extends or runs in a direction running from the upper toward the lower end of the drum or shell, as the case may be, and the lower ends of the second row, *f*, of such ribs terminate at the upper ends of the severing ribs or edges L, which fill out or continue for the balance of the length and to the lower end of the drum or shell. Each crushing-rib K, as before stated, has a vertical direction, and in and along its length it has an inclination in a line to intersect and cross at an acute angle the slant-height of the shell or drum, as the case may be. The vertical direction and inclination of the crushing or breaking ribs K of the drum is directly opposite to and such as to cross the vertical direction and inclination of the same class of ribs of the shell, and vice versa, and with the drum within the shell, as has been described, the two rows of crushing-ribs on each are opposite to and work together in the operation of this disintegration, as will hereinafter fully appear. The several crushing or breaking ribs K of each row are separated from each other, and the drum, as also the shell, has a series of vertical grooves, M, running from the upper end to the lower end thereof and at an inclination to intersect at an acute angle the slant-height, and the ribs in every instance run between such vertical running grooves. The severing-ribs L are in bunches or groups of five, or more or less, and each slightly projects beyond the surface of the drum or shell, as the case may be. The ribs of each group are in parallel, or substantially parallel, lines and have a vertical direction at an acute angle of inclination to and intersection of the slant-height, and this vertical direction and inclination of the ribs to the drum is directly opposite to and such as to cross such vertical direction and inclination of the ribs to the shell, and vice versa. The severing-ribs of the drum and of the shell are opposite to each other and work together, as will hereinafter fully appear.

Between the groups of severing-ribs the shell, as also the drum, has a channel or passage, N, all of which lead from the upper ends of the severing-ribs to the lower ends thereof and of the drum or shell, as the case may be, and there they severally open to the chamber or space at the bottom of the tank below the lower end of the drum and shell.

The material—straw, wood chips, &c.—to be reduced to pulp is placed in the tank, together with a sufficient quantity of water or other suitable liquid or liquids, and under the rotation of the drum, together with that of the fan-blades, such material or stock is caused to pass and circulate through the chamber or space between the drum and shell, entering the same at the upper end and escaping at the lower end, and as long as such rotation continues such circulation and movement of the material or stock go on. The rotation of the fan-blades moves the stock outwardly from under the shell and drum, and by creating a vacuum to a greater or less extent in the chamber under the shell and drum obviously thereby helps to draw the stock down through the chamber E of the shell between it and the drum. The stock, in passing through the shell, as described, is first crushed or broken by and between the rows of crushing and breaking ribs K of the drum and shell, and thence the material or stock passes to the severing-ribs, by which it is still further crushed and broken, when, passing out at the bottom, it again passes to and through the chamber of the shell, as before. While this circulation of the stock through the shell and drum is going on, by raising the drum from time to time through the lever-bar obviously the desired fineness in reduction of the stock may be secured. The stock, when sufficiently reduced, as described, is drawn off from the tank through any suitable outlet.

The arrangement of the severing-ribs in groups, the several groups separated by a channel, as described, facilitates the movement of the stock and of the liquid, and gives them greater freedom in their movement through the chamber of the shell.

The peculiar arrangement of the crushing-ribs and of the severing-ribs upon the shell and drum herein described causes the stock which is between and is being acted upon by them to be rubbed and drawn along their length, and thus the stock is the more effectually crushed and broken.

If desired, chemicals capable of softening the albuminous or resinous matter in the stock may be used with water or other liquid in the operation of the disintegration above described, and, if necessary, the water, &c., may be heated with a jet of steam, or otherwise. Again, the stock while being reduced to pulp, as above stated, may be bleached, and, furthermore, treated with chemicals, as described in the schedule annexed to the Letters Patent issued to me, dated October 23, 1877, No. 196,515.

The tank can have wire-gauze screens in its sides for the escape of the water and the sediment or dirt thereof, while retaining the stock against escape, and the tank also may have stationary wings or partitions to prevent the rotation of the stock, &c., in the tank while the drum and fan-blades are at work.

The truncated conical drum D may be raised and lowered in the shell B by the upper portion of its shaft F in lieu of by its lower portion, as has been particularly described, and such an arrangement is shown in Figs. 7 and 8. In these figures, H is the lever-bar, and c is its adjusting-screw, the same as before, and O is the bearing-block for the shaft F. This block is suspended by trunnion-pins g in an opening, h, of the lever-bar H, and it is located between collars l of the shaft. By this arrangement the raising and lowering of the lever-bar H by the screw c lift and lower the drum D, and the suspension of the bearing-block by trunnions prevents strain upon the shaft as it is raised and lowered. It is plain, however, that there are many ways other than those particularly described in which the drum D can be arranged to be raised and lowered in its shell B, and it is not intended to limit the invention to any one particular arrangement of mechanism for such purpose.

Having thus described my invention, what I claim, and desire to secure by Letters Patent, is—

1. In a tank, A, the rotating vertical drum D and fixed vertical shell B, each of conical shape and each provided with ribs that are arranged in one or more rows and severally run in a vertical and inclined direction, and are disposed, the ribs of the drum to intersect and cross the ribs of the shell, in combination with the chamber between the shell and drum, and open at both ends to the tank, all substantially as described, for the purpose specified.

2. In a tank, the rotating vertical drum D and fixed vertical shell B, each of conical shape and each provided with ribs that are arranged in one or more rows and severally run in a vertical and inclined direction, and are disposed, the ribs of the drum to intersect and cross the ribs of the shell and the ribs of each to be separated by a vertical channel or groove, in combination with the chamber E, between the shell and the drum, and open at both ends to the tank, all substantially as described, for the purpose set forth.

3. In a tank, A, the rotating vertical drum D, the fixed vertical shell, each of conical shape and each provided with ribs that are arranged in one or more rows and severally run in a vertical and inclined direction, and are disposed, the ribs of the drum to intersect and cross the ribs of the shell, and the chamber E, between the drum and shell, open at both ends to the tank, in combination with mechanism adapted to raise and lower the drum within the shell, all substantially as described, for the purposes specified.

4. In a tank, A, the rotating vertical drum D, the fixed vertical shell B, each of conical shape and each provided with ribs that are arranged in one or more rows and severally run in a vertical and inclined direction, and are disposed the ribs of the drum to intersect and cross the ribs of the shell, and the chamber between the drum and shell, open at both ends to the tank, in combination with the rotating fan located at the bottom of the drum and shell and within the chamber of the tank, all substantially as and for the purpose described.

5. The tank A, the rotating vertical drum D, the fixed vertical shell B, each of conical shape and each provided with vertical inclined ribs—such as the crushing and severing ribs, or either of them—in one or more rows, and running, the ribs of the one in a direction across the ribs of the other, and with grooves or channels M N between the ribs, the annular chamber between the shell and drum, open at both ends to the tank, and the rotating fan J, all substantially as described, for the purpose specified.

In testimony whereof I have hereunto set my hand in the presence of two subscribing witnesses.

MOORE R. FLETCHER.

Witnesses:
EDWIN W. BROWN,
WM. G. BELLOWS.